United States Patent
Zhou

(10) Patent No.: US 10,186,218 B2
(45) Date of Patent: Jan. 22, 2019

(54) DRIVE CIRCUIT AND LIQUIDE CRYSTAL DISPLAY DEVICE WITH THE DRIVE CIRCUIT

(71) Applicant: Wuhan China Star Optoelectronics Technology Co., Ltd., Wuhan, Hubei (CN)

(72) Inventor: Jinjie Zhou, Guangdong (CN)

(73) Assignee: Wuhan China Star Optoelectronics Technology Co., Ltd., Wuhan, Hubei (CN)

( * ) Notice: Subject to any disclaimer, the term of this patent is extended or adjusted under 35 U.S.C. 154(b) by 230 days.

(21) Appl. No.: 15/126,468

(22) PCT Filed: Jul. 25, 2016

(86) PCT No.: PCT/CN2016/091511
§ 371 (c)(1),
(2) Date: Sep. 15, 2016

(87) PCT Pub. No.: WO2018/010209
PCT Pub. Date: Jan. 18, 2018

(65) Prior Publication Data
US 2018/0197494 A1 Jul. 12, 2018

(30) Foreign Application Priority Data
Jul. 13, 2016 (CN) .......................... 2016 1 0549683

(51) Int. Cl.
*G09G 3/36* (2006.01)
*G06F 3/041* (2006.01)
*G06F 3/044* (2006.01)

(52) U.S. Cl.
CPC ........... *G09G 3/3648* (2013.01); *G06F 3/041* (2013.01); *G06F 3/0412* (2013.01); *G09G 3/36* (2013.01);
(Continued)

(58) Field of Classification Search
CPC ......... G09G 3/3648; G09G 2320/0233; G09G 3/36; G09G 2320/0214; G09G 2354/00;
(Continued)

(56) References Cited

U.S. PATENT DOCUMENTS

2004/0263456 A1* 12/2004 Miyachi ............... G09G 3/3607
345/88
2007/0091041 A1* 4/2007 Chung .................. G09G 3/006
345/88
(Continued)

FOREIGN PATENT DOCUMENTS

| CN | 101221735 A | 7/2008 |
| CN | 101630493 A | 1/2010 |

(Continued)

*Primary Examiner* — Dmitriy Bolotin
(74) *Attorney, Agent, or Firm* — Andrew C. Cheng

(57) ABSTRACT

A drive circuit adapted for a liquid crystal display device and includes a CE circuit, a memory, a data compensating circuit and a timing controller. The CE circuit, the data compensating circuit and the timing controller are electrically connected successively, and the memory is electrically connected to the data compensating circuit. The CE circuit is for receiving image data and performing an image color enhancement processing onto the image data. The memory is for storing compensation values for Mura compensation to the liquid crystal display device. The data compensating circuit is for obtaining the compensation value corresponding to the image data from the memory and performing compensation calculation. The timing controller is for receiving the compensated image data, converting the compensated image data into signals required by the liquid crystal display device. The invention further provides a liquid crystal display device with the drive circuit.

12 Claims, 3 Drawing Sheets

(52) U.S. Cl.
CPC ............ *G06F 3/044* (2013.01); *G06F 3/0416* (2013.01); *G09G 2310/0297* (2013.01); *G09G 2320/0214* (2013.01); *G09G 2320/0233* (2013.01); *G09G 2320/0285* (2013.01); *G09G 2354/00* (2013.01)

(58) Field of Classification Search
CPC .... G09G 2310/0297; G09G 2320/0285; G06F 3/041; G06F 3/0412; G06F 3/0416; G06F 3/044
See application file for complete search history.

(56) References Cited

U.S. PATENT DOCUMENTS

| | | | | |
|---|---|---|---|---|
| 2007/0091042 | A1* | 4/2007 | Chung | G09G 3/3648 345/88 |
| 2007/0182441 | A1* | 8/2007 | Hwang | G09G 3/3648 345/204 |
| 2009/0096729 | A1* | 4/2009 | Ozawa | G09G 3/3648 345/87 |
| 2009/0115801 | A1* | 5/2009 | Jeon | G09G 3/2007 345/690 |
| 2010/0002197 | A1* | 1/2010 | Kaneko | G03B 21/005 353/31 |
| 2010/0013750 | A1* | 1/2010 | Kerofsky | G09G 3/006 345/89 |
| 2011/0007088 | A1* | 1/2011 | Park | G09G 5/02 345/590 |
| 2013/0162701 | A1* | 6/2013 | Yang | G09G 3/3406 345/691 |
| 2015/0145841 | A1* | 5/2015 | Lee | G09G 3/006 345/207 |
| 2015/0154929 | A1* | 6/2015 | Li | G09G 3/3611 345/212 |
| 2016/0012802 | A1 | 1/2016 | Woo et al. | |
| 2016/0117978 | A1* | 4/2016 | Shikata | G09G 3/2096 345/690 |
| 2016/0140917 | A1* | 5/2016 | Hyung | G09G 3/3648 345/694 |

FOREIGN PATENT DOCUMENTS

| | | |
|---|---|---|
| CN | 103076954 A | 5/2013 |
| CN | 103943077 A | 7/2014 |
| CN | 104599650 A | 5/2015 |
| CN | 104715735 A | 6/2015 |
| CN | 105244004 A | 1/2016 |
| CN | 105280149 A | 1/2016 |
| CN | 105551439 A | 5/2016 |
| JP | 2005-134866 A | 5/2005 |

* cited by examiner

DRIVE CIRCUIT AND LIQUIDE CRYSTAL DISPLAY DEVICE WITH THE DRIVE CIRCUIT

CROSS REFERENCE TO RELATED APPLICATION

This application claims the priority of Chinese Patent Application No. 201610549683.5, entitled "Drive Circuit and Liquid Crystal Display Device with the Drive Circuit", filed on Jul. 13, 2016, the disclosure of which is incorporated herein by reference in its entirety.

FIELD OF THE INVENTION

The invention relates to the field of liquid crystal display, and particularly to a drive circuit and a liquid crystal display device with the drive circuit.

BACKGROUND OF THE INVENTION

Please refer to FIG. 1, in a full in-cell design, a common electrode (Vcom ITO) layer 201 needs to be divided into multiple (i.e., more than one) small rectangular blocks as sensing blocks 202, and then the sensing blocks 202 are connected to a drive circuit 204 by metal wires 203 and thereby a design of a self-capacitive touch panel is completed. In the design, the multiple sensing blocks 202 each need to perform a time-division multiplexing operation, i.e., work for a display function and a touch function in different time periods respectively. Therefore, it is needed to provide appropriate voltage waveforms to the sensing blocks 202 and related wires so as to meet the requirement.

Please also refer to FIG. 2, patterned metal wires (Metal3) 203 and source lines 206 of the touch panel all are overlapped with a black matrix layer 205 of pixels. Please refer to FIG. 3 and FIG. 4 together, the touch panel further includes a demultiplexer (Demux) used for controlling conduction and disconnection between a terminal of Source and RGB. In order to avoid generating a coupling effect between the metal wires 203 and the source lines 206, a loading of the touch panel is increased in need. Generally, in display and touch stages, the respective lines will be applied with voltages having voltage waveforms as shown in FIG. 4. That is, in the touch stage, when there is a touch happening, the source lines 206 and the demultiplexer will transmit a signal with a same waveform as that on the metal wires 203 (Vcom), so as to avoid generating the coupling effect.

Because in the touch stage, when there is no touch happening, the source lines 206 are in a state of low level (the demultiplexer is at a continuous high level at this time), which is equivalent to grounding, although the gate has been closed at this time. However, because a thin film transistor (TFT) has a certain leakage current, some of charges of a liquid crystal capacitance would leak through the source lines 206. Generally, multiple touch stages would be divided equally in a scanning time in a frame of image, which makes electricity leakage times of the respective touch stages be different, resulting in a problem of uneven brightness spots (Mura) or color difference occurred in the image.

SUMMARY OF THE INVENTION

Accordingly, the invention provides a drive circuit capable of realizing Mura compensation, which can eliminate blocky Mura caused by electricity leakage during time-division multiplexing and thereby improve image display quality.

Moreover, the invention further provides a liquid crystal display device having the drive circuit.

Specifically, the invention in one aspect provides a drive circuit adapted for a liquid crystal display device. The drive circuit includes a CE (color enhancement) circuit, a memory, a data compensating circuit and a timing controller. The CE circuit, the data compensating circuit and the timing controller are electrically connected successively in that order, and the memory is electrically connected to the data compensating circuit. The CE circuit is configured (i.e., structured and arranged) for receiving image data and performing an image color enhancement processing to the image data. The memory is configured for storing compensation values for Mura compensation to the liquid crystal display device. The data compensating circuit is configured for obtaining the compensation value corresponding to the image data from the memory and performing a compensation calculation. The timing controller is configured for receiving the image data after being performed with the compensation calculation from the data compensating circuit and converting the image data after being performed with the compensation calculation into signals required by the liquid crystal display device.

In an embodiment, the memory is configured for storing compensation values of touch stages of the liquid crystal display device, and the touch stages are divided based on a number/amount of rows in a vertical scanning direction of the liquid crystal display device.

In an embodiment, the data compensating circuit includes a counter and a compensation calculating module. The drive circuit further includes a horizontal synchronizing signal. The counter is configured for detecting the horizontal synchronizing signal, determining a row number corresponding to current image data according to the detected horizontal synchronizing signal and thereby determining the touch stage corresponding to the current image data. The compensation calculating module is configured for taking out a corresponding one of the compensation values from the memory according to the touch stage corresponding to the current image data and performing a compensation calculation.

In an embodiment, the compensation calculation is to make the corresponding compensation value be added to or subtracted from the current image data.

In an embodiment, the drive circuit further includes a CABC (content adaptive brightness control) circuit connected between the CE circuit and the data compensating circuit. The CABA circuit is configured for receiving the image data from the CE circuit and performing a power saving adjustment according to a current displayed image.

The invention in another aspect provides a liquid crystal display device including a drive circuit and a liquid crystal display panel connected with the drive circuit. The drive circuit includes a CE (color enhancement) circuit, a memory, a data compensating circuit and a timing controller. The CE circuit, the data compensating circuit and the timing controller are electrically connected successively, and the memory is electrically connected to the data compensating circuit. The CE circuit is configured for receiving image data and performing an image color enhancement processing to the image data. The memory is configured for storing compensation values for Mura compensation to the liquid crystal display device. The data compensating circuit is configured for obtaining the compensation value corresponding to the image data from the memory and performing a compensation calculation. The timing controller is configured for receiving the image data after being performed with the compensation calculation from the data compensating circuit, converting the image data after being performed with the compensation calculation into signals required by the liquid crystal display device and outputting the signals to the liquid crystal display panel.

In an embodiment, the memory is configured for storing compensation values of touch stages of the liquid crystal display device, and the touch stages are divided based on a number/quantity of rows in a vertical scanning direction of the liquid crystal display device.

In an embodiment, the data compensating circuit includes a counter and a compensation calculating module. The drive circuit further includes a horizontal synchronizing signal. The counter is configured for detecting the horizontal synchronizing signal, determining the row number corresponding to current image data according to the detected horizontal synchronizing signal and thereby determining the touch stage corresponding to the current image data. The compensation calculating module is configured for taking out a corresponding one of the compensation values from the memory according to the touch stage corresponding to the current image data and performing compensation calculation.

In an embodiment, the compensation calculation is to make the corresponding compensation value be added to or subtracted from the current image data.

In an embodiment, the drive circuit further includes a CABC (content adaptive brightness control) circuit connected between the CE circuit and the data compensating circuit. The CABA circuit is configured for receiving the image data from the CE circuit and performing a power saving adjustment according to a current displayed image.

Compared with the prior art, in the drive circuit and the liquid crystal display device with the drive circuit as described in the embodiments of the invention, they can determine the touch stage corresponding to current image data, take out compensation values corresponding to respective touch stages from the memory and perform corresponding compensation calculations to obtain new image data, and therefore the Mura drawback caused by electricity leakage during time-division multiplexing can be eliminated and image display quality is improved consequently.

BRIEF DESCRIPTION OF THE DRAWINGS

In order to more clearly illustrate technical solutions of embodiments of the invention or the prior art, drawings will be used in the description of embodiments or the prior art will be given a brief description below. Apparently, the drawings in the following description only are some of embodiments of the invention, the ordinary skill in the art can obtain other drawings according to these illustrated drawings without creative effort.

DETAILED DESCRIPTION OF THE PREFERRED EMBODIMENTS

Figure 1:
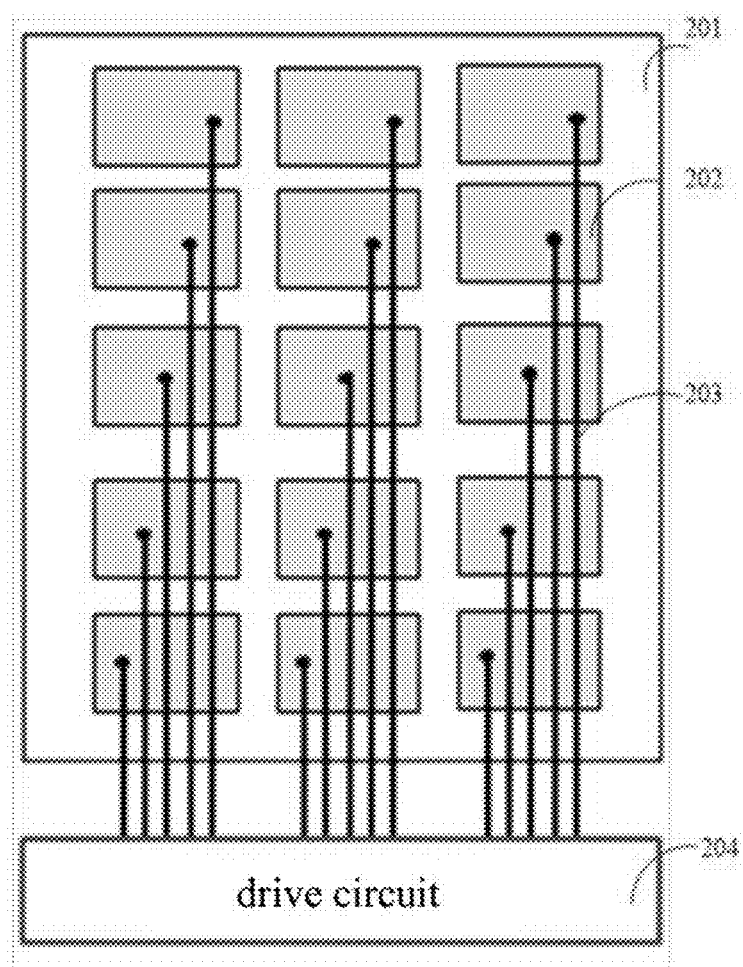
FIG. 1 is a schematic plan view of a conventional touch panel.
Figure 2:
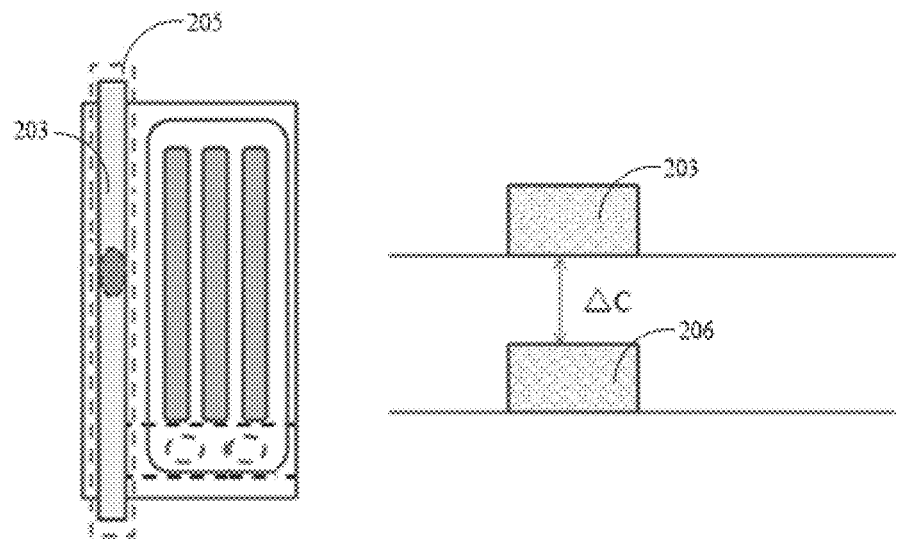
FIG. 2 is a schematic view of wiring of the conventional touch panel.
Figure 3:
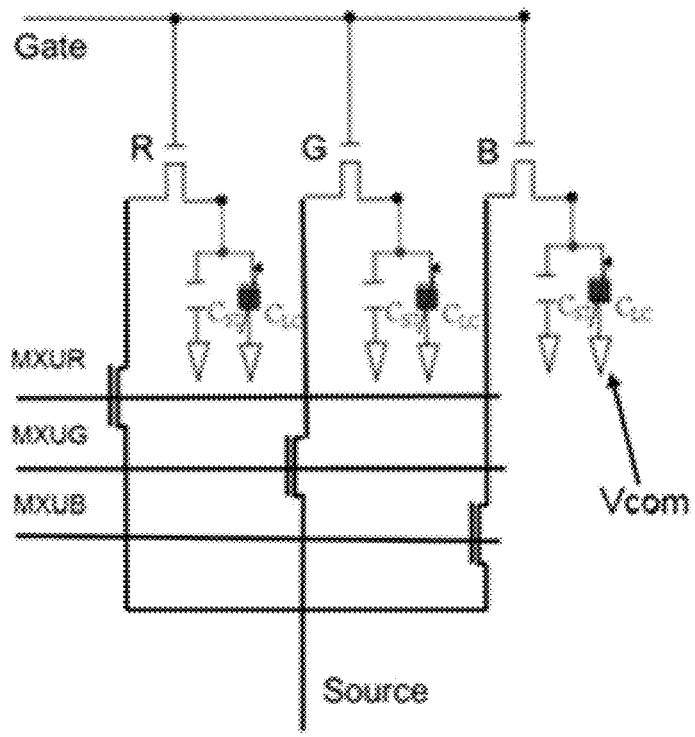
FIG. 3 is an equivalent circuit diagram of a single pixel block of the conventional touch panel.
Figure 4:
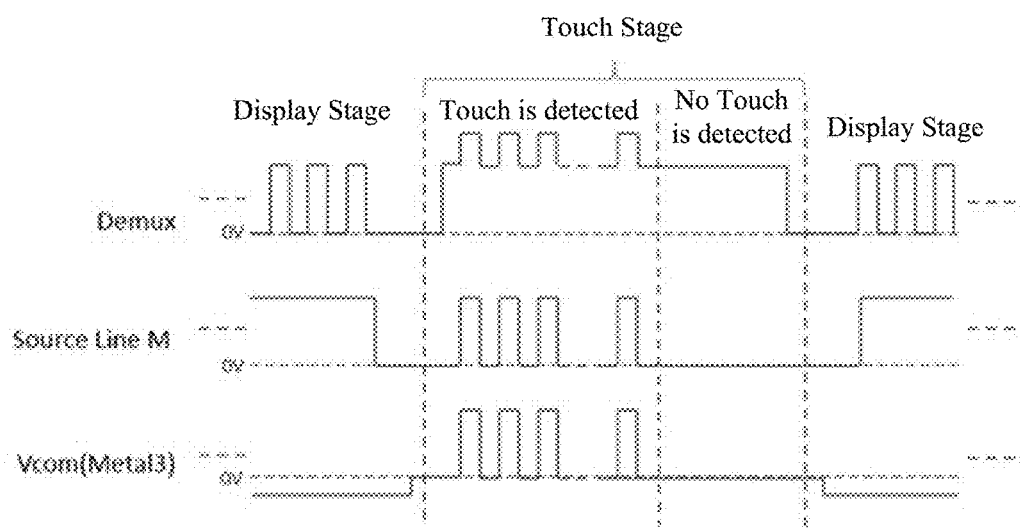
FIG. 4 is a diagram of voltage waveforms of a source line, a demultiplexer and a metal wire of the conventional touch panel.

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Moreover, the following description of various embodiments is with reference to accompanying drawings and for exemplarily illustrating specific embodiments which are embodied by the invention. Directional terminologies mentioned in the invention for example "upper", "lower", "front", "rear", "left", "right", "inside", "outside", "side surface" and so on only are with reference to directions of accompanying drawings, and therefore the used directional terminologies are used for better and more clearly illustrating and understanding the invention, rather than indicating or implying devices or elements must have specific orientations, and be structured and operated with specific orientations, and therefore cannot construed as limiting of the invention.

In the description of the invention, it is noted that, unless otherwise clearly defined and limited, terms "installing", "connecting with", "connected" should be broadly understood, for example, it may be fixedly connected, may be detachably connected or integrally connected; it may be mechanically connected; it may be directly connecting with, may be indirectly connecting with by an intermediary, may be internally communicated between two elements. For those ordinary skills in the art, specific meanings of the above terms in the invention can be understood according to specific situations.

In addition, in the description of the invention, unless otherwise indicated, "multiple" means two or more than two. If the specification appears the term "step", it not only means an individual process, when it cannot distinguish from the other step, as long as it can realize the intended function of the step, it should be included in the term. Furthermore, in this specification, a numerical range expressed by "~" means a range containing values before and after "~" respectively as the minimum value and the maximum value. In the drawings, units with similar or same structures are denoted by same reference numerals.

Figure 5:
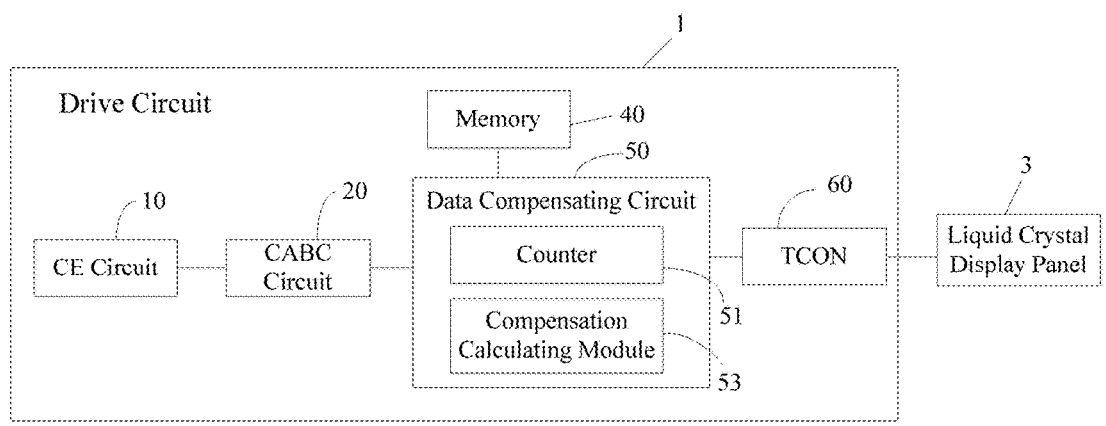
FIG. 5 is a functional circuit diagram of a liquid crystal display device of a preferred embodiment of the invention.

Referring to FIG. 5, FIG. 5 is a functional circuit diagram of a liquid crystal display device 100 of a preferred embodiment of the invention. As shown in FIG. 5, the liquid crystal display device 100 includes a drive circuit 1 and a liquid crystal display panel 3 connected with the drive circuit 1.

The drive circuit 1 includes a color enhancement (generally referred to as CE) circuit 10, a content adaptive brightness control (generally referred to as CABC) circuit 20, a memory 40, a data compensating circuit 50 and a timing controller (generally referred to as TCON) 60. The CE circuit 10, the CABC circuit 20, the data compensating circuit 50 and the TCON 60 are successively connected in that order, and the memory 40 is connected to the data compensating circuit 50.

The CE circuit 10 is used for receiving front-end data, and in a preferred embodiment, the front-end data is image data provided to the liquid crystal display device 100. The CE circuit 10 is further used for performing a color enhancement processing onto the image data. The CABA circuit 20 is used for receiving the image date from the CE circuit 20 and performing a power saving adjustment by increasing content grayscale standard while reducing backlight brightness according to a current displayed image. The memory 40 is used for storing compensation values for Mura compensation to the liquid crystal display device 100. The data compensating circuit 50 is used for obtaining the compensation value corresponding to the image data from the memory 40 and performing compensation calculation. The TCON 60 is used for receiving the image data after being performed with the compensation calculation from the data compensating circuit 50, converting the image date into signals such as CKV signal, STV signal and Data signal as required by the liquid crystal display panel 3 and outputting the signals to the liquid crystal display panel 3.

The memory 40 is further used for storing compensation values for respective touch stages of the liquid crystal display device 100. The touch stages can be divided into 10 to 15 segments and a specific value of dividing can be adjusted according to actual needs of users. In a preferred embodiment, the touch stages are divided into 10 segments. The touch stages are divided based on the number/amount of rows in a vertical scanning direction of the liquid crystal display device 100.

In a preferred embodiment, a liquid crystal display device 100 with a resolution of 1080×1920 is taken as an example for the purpose of illustration. The number of rows in the vertical scanning direction of the liquid crystal display device 100 is 1920, and it is divided into 10 stages, e.g., the rows 1-200 are as a first touch stage, the rows 201-400 are as a second touch stage, . . . , the rows 1800-1920 are as a tenth touch stage, each stage corresponds to one compensation value and therefore there are ten compensation values in total which are P1, P2, . . . , P10 respectively, and the ten compensation values P1, P2, . . . , P10 are all stored in the memory 40. The compensation values can be adjusted according to the characteristics of the liquid crystal display device 100, and the compensation values corresponding to the touch stages generally are different.

In a preferred embodiment of the invention, during a process of display scanning of the liquid crystal display device 100, the drive circuit 1 further includes a horizontal synchronizing signal, and each horizontal synchronizing signal represents one row. The data compensating circuit 50 includes a counter 51 and a compensation calculating module 53.

The counter 51 detects the horizontal synchronizing signal and determines the row number corresponding to the current image data according to the detected horizontal synchronizing signal and further determines the touch stage corresponding to the current image data. More specifically, when the counter 51 detects one horizontal synchronizing signal, the counted row number is added with 1, the counter 51 calculates the row number corresponding to the current image data according to the horizontal synchronizing signal and then determines the touch stage corresponding to the current image data. After completing the scanning of one frame of image, the counted row number of the counter 51 is cleared to zero.

The compensation calculating module 53 takes out a corresponding compensation value Pn from the memory 40 according to the touch stage corresponding to the current image data and performs corresponding compensation calculation to obtain new image data, where n is a positive integer. In a preferred embodiment, n is a positive integer greater than or equal to 1 and less than or equal to 10. In a preferred embodiment, the compensation calculation is to make the compensation value be added to or subtracted from the current image data.

In summary, the drive circuit 1 and the liquid crystal display device 100 with the drive circuit 1 according to the above embodiments of the invention can determine the touch stage corresponding to current image data, take out a corresponding compensation value of the touch stage from the memory 40 and perform corresponding compensation calculation to obtain new image data, and therefore the Mura drawback caused by electricity leakage during the time-division multiplexing can be eliminated and image display quality is improved consequently.

In the description of the specification, the reference terms "one embodiment", "some embodiments", "an example", "specific example" or "some examples" and so on mean a specific characteristics, a structure, a material or a feature in conjunction with the description of the embodiment or example is included in at least one embodiment or example of the invention. In the specification, the exemplary description of the above terms necessarily means the same embodiment or example. Moreover, the described specific characteristics, structure, material or feature can be combined in a suitable manner in any one or more embodiments or examples.

The foregoing disclosure is only preferred embodiments of the Invention, and should not be used to limit the protection scope of the invention. The equivalent modifications which are made by the ordinary skilled person in the art after understanding all or some of the steps of the above embodiments and according to the appended claims of the invention still belong to the protection scope of the invention.

What is claimed is:

1. A drive circuit adapted for a liquid crystal display device, wherein the drive circuit comprises a color enhancement circuit, a memory, a data compensating circuit and a timing controller; the color enhancement circuit, the data compensating circuit and the timing controller are electrically connected successively, and the memory is electrically connected to the data compensating circuit; the color enhancement circuit is configured for receiving image data and performing an image color enhancement processing onto the image data, the memory is configured for storing compensation values for Mura compensation to the liquid crystal display device, the data compensating circuit is configured for obtaining the compensation value corresponding to the image data from the memory and performing compensation calculation, the time controller is configured for receiving the image data after being performed with the compensation calculation from the data compensating circuit and converting the image data after being performed with the compensation calculation into signals required by the liquid crystal display device;

wherein the memory is configured for storing compensation values of touch stages of the liquid crystal display device, and the touch stages are divided based on a number of rows in a vertical scanning direction of the liquid crystal display device.

2. The drive circuit according to claim 1, wherein the data compensating circuit comprises a counter and a compensation calculating module, and the drive circuit further comprises a horizontal synchronizing signal; the counter is configured for detecting the horizontal synchronizing signal, determining a row number corresponding to current image data and thereby determining the touch stage corresponding to the current image data; the compensation calculating module is configured for taking out a corresponding one of the compensation values from the memory according to the touch stage corresponding to the current image data and performing compensation calculation.

3. The drive circuit according to claim 2, wherein the compensation calculation is to make the corresponding compensation value be added to or subtracted from the current image data.

4. The drive circuit according to claim 3, wherein the drive circuit further comprises a content adaptive brightness control circuit connected between the color enhancement circuit and the data compensating circuit; the content adaptive brightness control circuit is configured for receiving the image data from the color enhancement circuit and performing a power saving adjustment according to a current displayed image.

5. The drive circuit according to claim 2, wherein the drive circuit further comprises a content adaptive brightness control circuit connected between the color enhancement circuit and the data compensating circuit; the content adaptive brightness control circuit is configured for receiving the image data from the color enhancement circuit and performing a power saving adjustment according to a current displayed image.

6. The drive circuit according to claim 1, wherein the drive circuit further comprises a content adaptive brightness control circuit connected between the color enhancement circuit and the data compensating circuit; the content adaptive brightness control circuit is configured for receiving the image data from the color enhancement circuit and performing a power saving adjustment according to a current displayed image.

7. A liquid crystal display device comprising a drive circuit and a liquid crystal display panel connected with the drive circuit; wherein the drive circuit comprises a color enhancement circuit, a memory, a data compensating circuit and a timing controller; the color enhancement circuit, the data compensating circuit and the timing controller are electrically connected successively in that order, and the memory is electrically connected to the data compensating circuit; the color enhancement circuit is configured for receiving image data and performing a image color enhancement processing onto the image data; the memory is configured for storing compensation values for Mura compensation to the liquid crystal display device; the data compensating circuit is configured for obtaining the compensation value corresponding to the image data from the memory and performing compensation calculation; the time controller is configured for receiving the image data after being performed with the compensation calculation from the data compensating circuit, converting the image data after being performed with the compensation calculation into signals required by the liquid crystal display device and outputting the signals to the liquid crystal display panel;

wherein the memory is configured for storing compensation values of touch stages of the liquid crystal display device, and the touch stages are divided based on a quantity of rows in a vertical scanning direction of the liquid crystal display device.

8. The liquid crystal display device according to claim 7, wherein the data compensating circuit comprises a counter and a compensation calculating module, and the drive circuit further comprises a horizontal synchronizing signal; the counter is configured for detecting the horizontal synchronizing signal, determining a row number corresponding to current image data according to the horizontal synchronizing signal and thereby determining the touch stage corresponding to the current image data; the compensation calculating module is configured for taking out a corresponding one of the compensation values from the memory according to the touch stage corresponding to the current image data and performing compensation calculation.

9. The liquid crystal display device according to claim 8, wherein the compensation calculation is to make the corresponding compensation value be added to or subtracted from the current image data.

10. The liquid crystal display device according to claim 9, wherein the drive circuit further comprises a content adaptive brightness control circuit connected between the color enhancement circuit and the data compensating circuit; the content adaptive brightness control circuit is configured for receiving the image data from the color enhancement circuit and performing a power saving adjustment according to a current displayed image.

11. The liquid crystal display device according to claim 8, wherein the drive circuit further comprises a content adaptive brightness control circuit connected between the color enhancement circuit and the data compensating circuit; the content adaptive brightness control circuit is configured for receiving the image data from the color enhancement circuit and performing a power saving adjustment according to a current displayed image.

12. The liquid crystal display device according to claim 7, wherein the drive circuit further comprises a content adaptive brightness control circuit connected between the color enhancement circuit and the data compensating circuit; the content adaptive brightness control circuit is configured for receiving the image data from the color enhancement circuit and performing a power saving adjustment according to a current displayed image.

* * * * *